(12) United States Patent
Meier et al.

(10) Patent No.: US 6,912,264 B2
(45) Date of Patent: Jun. 28, 2005

(54) FUEL ASSEMBLY

(75) Inventors: Werner Meier, Kunreuth (DE); Peter Rau, Leutenbach (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 10/642,548

(22) Filed: Aug. 15, 2003

(65) Prior Publication Data

US 2004/0032925 A1 Feb. 19, 2004

Related U.S. Application Data

(63) Continuation of application No. PCT/EP02/01546, filed on Feb. 14, 2002.

(30) Foreign Application Priority Data

Feb. 15, 2001 (DE) .......................................... 101 07 037

(51) Int. Cl.[7] ............................................. G21C 3/332
(52) U.S. Cl. ....................... 376/439; 376/434; 376/436; 376/438; 376/442; 376/443; 376/453; 376/454
(58) Field of Search ................................ 376/434, 436, 376/438, 439, 442, 443, 453, 454

(56) References Cited

U.S. PATENT DOCUMENTS

| | | | | |
|---|---|---|---|---|
| 3,395,077 A | * | 7/1968 | Long et al. .................. | 376/439 |
| 3,663,367 A | | 5/1972 | Calvin .......................... | 176/78 |
| 3,809,609 A | * | 5/1974 | Krawiec et al. ............. | 376/439 |
| 3,847,736 A | * | 11/1974 | Bevilacqua .................. | 376/439 |
| 3,862,000 A | * | 1/1975 | Pugh et al. .................. | 376/439 |
| 3,886,038 A | * | 5/1975 | Raven .......................... | 376/439 |
| 3,933,584 A | * | 1/1976 | Litt .............................. | 376/439 |
| 4,089,741 A | * | 5/1978 | Patterson et al. ........... | 376/439 |
| 4,692,302 A | * | 9/1987 | DeMario et al. ............ | 376/439 |
| 4,698,204 A | * | 10/1987 | Taleyarkhan ................ | 376/439 |

(Continued)

FOREIGN PATENT DOCUMENTS

| | | | |
|---|---|---|---|
| DE | 693 06 364 T2 | | 5/1994 |
| DE | 44 01 602 A1 | | 8/1995 |
| EP | 0239441 | * | 9/1987 |
| EP | 0308701 | * | 3/1989 |
| EP | 000514116 | * | 11/1992 |
| EP | 0 517 750 B1 | | 12/1992 |
| EP | 0 696 805 A1 | | 2/1996 |
| EP | 1 049 106 A1 | | 11/2000 |
| JP | 6 094 873 | | 4/1994 |
| JP | 8 179 072 | | 2/1996 |
| JP | 08122474 A | | 5/1996 |
| JP | 09159775 A | | 6/1997 |

Primary Examiner—Michael J. Carone
Assistant Examiner—John Richardson
(74) Attorney, Agent, or Firm—Laurence A. Greenberg; Werner H. Stemer; Gregory L. Mayback

(57) ABSTRACT

A fuel element for a nuclear reactor has fuel rods with nuclear fuel guided through spacers. The spacers are equipped with devices that exert a swirling impulse upon a coolant flowing along the fuel rods. In order to present as little flow resistance as possible for the coolant, these swirl-introducing devices have the form of a vane with a spoonlike or bladelike shape and they extend into the coolant flow. Owing to the shape—here the vane is curved in the longitudinal and in the transverse directions—practically all cross sections of the vane have such a high geometrical moment of inertia that even a vane made of a thin sheet metal is sufficiently rigid. Fuel elements configured according to the invention are particularly suitable for use in boiling water nuclear reactors.

15 Claims, 2 Drawing Sheets

U.S. PATENT DOCUMENTS

| | | | | |
|---|---|---|---|---|
| 4,726,926 A | * | 2/1988 | Patterson et al. | 376/439 |
| 4,728,489 A | * | 3/1988 | Hatfield | 376/439 |
| 4,765,949 A | | 8/1988 | Denizou et al. | 376/443 |
| 4,827,063 A | * | 5/1989 | Bokers et al. | 376/439 |
| 4,844,860 A | * | 7/1989 | Hatfield | 376/439 |
| 5,229,068 A | * | 7/1993 | Johansson et al. | 376/371 |
| 5,283,821 A | * | 2/1994 | Karoutas | 376/439 |
| 5,299,245 A | | 3/1994 | Aldrich et al. | 376/439 |
| 5,303,276 A | | 4/1994 | DeMario et al. | 376/442 |
| 5,327,472 A | * | 7/1994 | Kraemer et al. | 376/439 |
| 5,331,679 A | * | 7/1994 | Hirukawa | 376/439 |
| 5,384,815 A | * | 1/1995 | Patterson et al. | 376/444 |
| 5,440,599 A | * | 8/1995 | Rodack et al. | 376/439 |
| 5,515,408 A | * | 5/1996 | Oyama et al. | 376/434 |
| 5,666,389 A | * | 9/1997 | Andersson et al. | 376/462 |
| 5,668,728 A | * | 9/1997 | Dix et al. | 376/443 |
| 5,875,224 A | * | 2/1999 | Smith et al. | 376/439 |
| 6,393,087 B1 | * | 5/2002 | Oh et al. | 376/439 |
| 6,415,011 B1 | * | 7/2002 | Helmersson | 376/439 |
| 6,421,407 B1 | * | 7/2002 | Kang et al. | 376/439 |
| 6,650,723 B1 | * | 11/2003 | Kang et al. | 376/439 |
| 6,765,979 B1 | * | 7/2004 | Dix et al. | 376/435 |

\* cited by examiner

FUEL ASSEMBLY

CROSS-REFERENCE TO RELATED APPLICATION

This application is a continuation of copending International Application No. PCT/EP02/01546, filed Feb. 14, 2002, which designated the United States and which was not published in English.

BACKGROUND OF THE INVENTION

Field of the Invention

The invention relates to a fuel assembly comprising nuclear fuel with a multiplicity of fuel rods guided through spacers for use in a nuclear reactor in a nuclear power plant. A passage is formed between the fuel rods for a flow of coolant, and at least one spacer carries a vane which imparts a swirl impulse to the flow of coolant.

In a nuclear reactor of a nuclear power plant, the nuclear fuel is usually disposed in hermetically sealed fuel rods. Each fuel rod is several meters long and has a cladding tube with a diameter of approximately 11 mm and a wall thickness of approximately 1 mm. Each cladding tube is filled with nuclear fuel which has been pressed into pellets over virtually its entire length. Usually, approximately 80 to 300 fuel rods, depending on the type of reactor, are combined in a fuel assembly.

Fuel assemblies which are intended for use in boiling water reactors are provided with a so-called fuel assembly channel, which laterally surrounds the entire fuel assembly structure and is open at the bottom and at the top. Within the fuel assembly channel, the fuel rods are laterally supported by means of spacers, which for their part bear against the walls of the fuel assembly channel from the inside. Often, some of the possible fuel rod positions are fitted with a coolant tube instead of fuel rods. The fuel rods themselves form a multiplicity of cooling passages which extend over the entire length of the fuel assemblies and in which the spacers inevitably form particular flow resistances.

An assembly of this type is described in the commonly assigned U.S. Pat. No. 5,327,472 and European patent EP 0 517 750 B1. In that prior art configuration, the spacers bear vanes which are bent into the cooling passages formed by fuel rods in such a manner that they produce a swirl in the stream of coolant flowing through the cooling passage in question. A rotary motion of the stream of coolant about its vertical axis which is imposed by the swirl on the one hand—in particular in the upper region of the fuel assembly—is responsible for good wetting of the fuel rods with liquid coolant and on the other hand is also responsible for exchanging coolant between adjacent streams of coolant. To ensure a sufficiently large proportion of liquid coolant in the upper region of the fuel assembly, some of the coolant fed to the fuel assembly is passed directly into this region by means of a coolant tube. These measures—particularly in the case of boiling water reactors—ensure that the surfaces of the fuel rods themselves are still wetted with liquid coolant even in the upper region of the fuel assemblies, in which a significant proportion of the coolant has already evaporated.

The spacers which are required to guide and support the fuel rods, together with the vanes or lugs which they bear, are usually provided at intervals of approximately 0.5 m above one another and form a resistance to the streams of coolant. This resistance requires a not inconsiderable proportion of the pumping power of circulation pumps which drive the coolant. The pumping power required in known nuclear reactors is in the range of a few megawatts.

SUMMARY OF THE INVENTION

It is accordingly an object of the invention to provide a fuel assembly, which overcomes the above-mentioned disadvantages of the heretofore-known devices and methods of this general type and which is fitted with spacers that present only low flow resistances yet nevertheless generate a sufficiently powerful swirl in the streams of coolant.

With the foregoing and other objects in view there is provided, in accordance with the invention, a fuel assembly for a nuclear reactor in a nuclear power plant, comprising:
a plurality of spacers;
a multiplicity of fuel rods extending in a longitudinal direction through the spacers;
the fuel rods defining a passage for a flow of coolant therebetween; and
at least one of the spacers carrying a vane disposed to impart a swirl impulse to the flow of coolant, the vane being curved in the longitudinal direction and in a transverse direction and having a shape resembling a spoon or a paddle.

In other words, the objects of the invention are achieved in that the vanes which are supported by the spacer are curved in both the longitudinal direction and the transverse direction and are accordingly of a shape resembling a spoon or a paddle.

The invention is based on the consideration that in fuel assemblies holding nuclear fuel, means for exerting a swirl impulse on a stream of coolant which are provided at the spacer in a wide range of fuel rods guided through spacers for use in a nuclear reactor constitute the minimum possible flow resistance to the coolant if their shape means that with virtually all cross sections there is an area moment of inertia which is so large that even a simple vane made from thin sheet metal is sufficiently rigid.

Surprisingly, it is specifically the spoon- or paddle-like shape of the or each vane which allows the flow resistance of the spacer to be reduced in two respects. Firstly, this shape, on account of the high rigidity of the vane, makes it possible simply to use thin starting material for the spacers. Secondly, this shape allows optimized efficiency of the vane itself such that it acts as a turbine blade in the flow of coolant.

A particularly expedient optimization measure consists in this shape of the vane continuing as far as its root located in the spacer. In this case, the area moment of inertia of the cross sections of the vane reaches a maximum in the region where it emerges from the spacer.

In an advantageous configuration, to set the area moments of inertia of the cross sections of the spoon- or paddle-like shape of the vane, during production of the vane the material used is stretched and/or compressed in more than one direction. Moreover, firstly the width of the vane at its free end should preferably be half as wide as at its root. Secondly, the free length of the vane should be approximately double the width at its root. The or each vane and a web of the spacer which bears it advantageously form a single workpiece. In this case, the shape of the vane continues into the spacer over a distance corresponding to 0.5 to 1.0 times the free length of the vane. Furthermore, an opening is expediently provided beneath the root of the vane in the direction of the longitudinal axis of the vane. This opening is used to connect cells in the spacer which are separated from one another by the web which bears the vane.

The vane, or each vane, is bent out of the plane of the web which carries it, preferably by up to 45°, into the passage for the stream of coolant, the stream of coolant impinging on the concave side of the vane. In this case, a longitudinal axis of the vane expediently forms an acute angle with a longitudinal edge of the web on the side which faces an adjacent intersection with another web.

Two webs which cross one another should in each case bear one vane on both sides of the intersection. In this case, all the vanes which adjoin the same intersection should act on the stream of coolant in the same direction, while the vanes of intersections which adjoin one another produce oppositely directed swirl impulses. The vanes are preferably supported by the webs of the spacer on the side via which the coolant flows out. In this case, the webs are formed by sleeves which are connected to one another at their longitudinal sides and each of which surrounds one fuel rod.

The advantages which are achieved by the invention consist in particular in the fact that the use of, for example, only 0.2 mm thick metal sheet—instead of the approximately 0.4 mm thick metal sheet which has hitherto been customary—which is made possible by the high inherent rigidity of the vanes, in combination with the optimized shape of the vane, reduces the power required to drive a circulation pump by a few percent and accordingly significantly increases the efficiency of the reactor.

Other features which are considered as characteristic for the invention are set forth in the appended claims.

Although the invention is illustrated and described herein as embodied in a fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
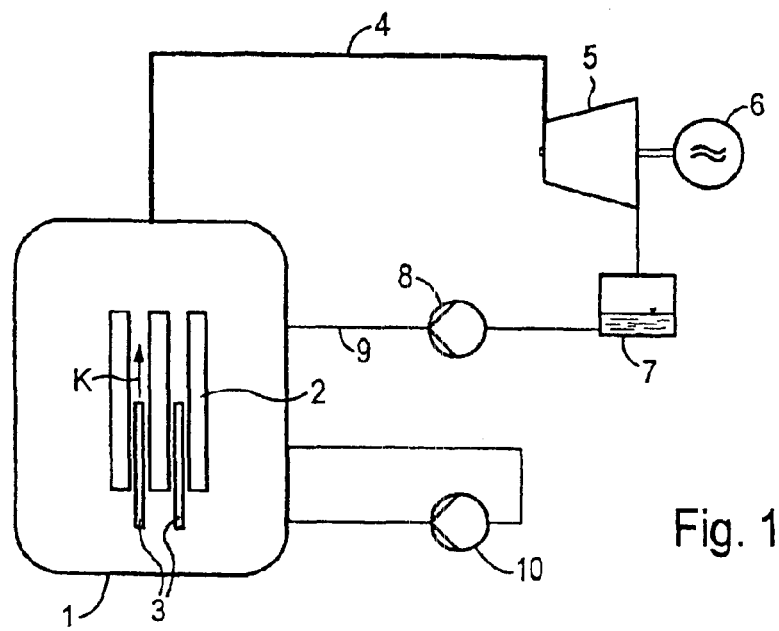
FIG. 1 is a schematic diagram illustrating a boiling water reactor with a steam turbine, a generator, and a condenser.

Referring now to the figures of the drawing in detail and first, particularly, to FIG. 1 thereof, there is shown a boiling water nuclear reactor (BWR) with fuel assemblies or fuel elements 2 and control rods 3 disposed in a pressure vessel 1. The control rods 3 can be moved into and out of spaces between the fuel assemblies 2 from below in order to control the neutron flux in the reactor core. Both the fuel assemblies 2 and the control rods 3 are cooled by water that flows through the reactor core from the bottom upward as coolant K. The water simultaneously serves as a moderator for the neutron flux by decelerating the neutrons down to a velocity range in which they can be trapped by atom nuclei of the nuclear fuel.

The coolant K is heated as it passes along and through the fuel assemblies 2 and in the process is partially evaporated. The steam thus formed is fed to a steam turbine 5 via a live steam line 4. The steam turbine 5 drives a generator 6. Used steam emerging from the steam turbine 5 condenses in a condenser 7 to form condensate which is fed back by a feed water pump 8 through a feed water line 9 into the upper part of the pressure vessel 1.

Coolant K which has not evaporated on the path along the fuel assemblies 2 flows back down through a non-illustrated ring circuit which surrounds the reactor core, and is fed by coolant pumps 10 into the space below the reactor core. In newer reactors, the coolant pump 10 is arranged directly in the ring circuit within the pressure vessel 1.

Figure 2:
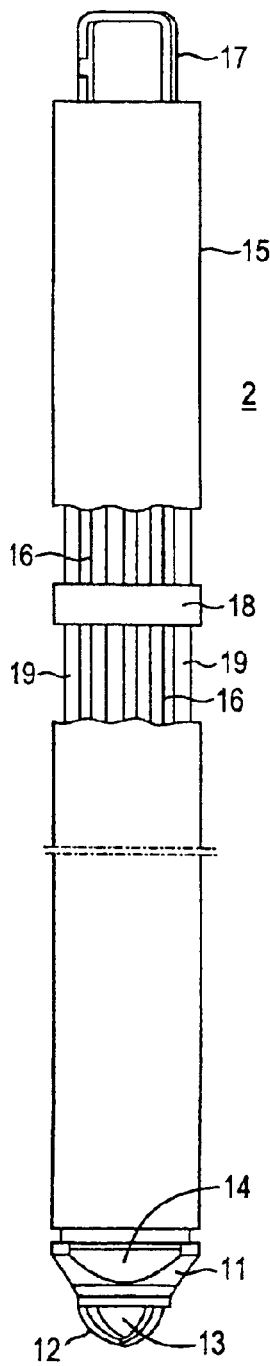
FIG. 2 is a partly broken-away side elevation of a fuel assembly.

FIG. 2 shows a more detailed illustration of one of the fuel assemblies 2. A fuel assembly root 11 positions the fuel assembly 2 by means of a fitting member 12 onto a lower tie plate. The assembly root 11 has inflow openings 13, 14 for the coolant K. A fuel element casing or channel 15 surrounds a bundle of fuel rods 16 over their entire length, is supported at the bottom on the fuel assembly root 11 and in its upper end bears a fuel assembly head, of which only a handle 17 projects upward out of the fuel assembly casing 15. The fuel rods 16, which are approximately 4.5 m long and approximately 11 mm thick, are filled with pelleted nuclear fuel. Spacers 18 are used to stabilize and guide the bundle of fuel rods 16 and are in turn supported laterally against the fuel assembly channel 15 from the inside; by way of example, ten of these spacers, generally at approximately regular intervals above one another, hold the fuel rods 16 together. Some of the possible fuel rod positions are provided with holding rods 19 instead of fuel rods 16 and absorb tensile forces which occur in the fuel assembly 2 between the fuel assembly root 11 and the fuel assembly head.

Figures 3, 4:
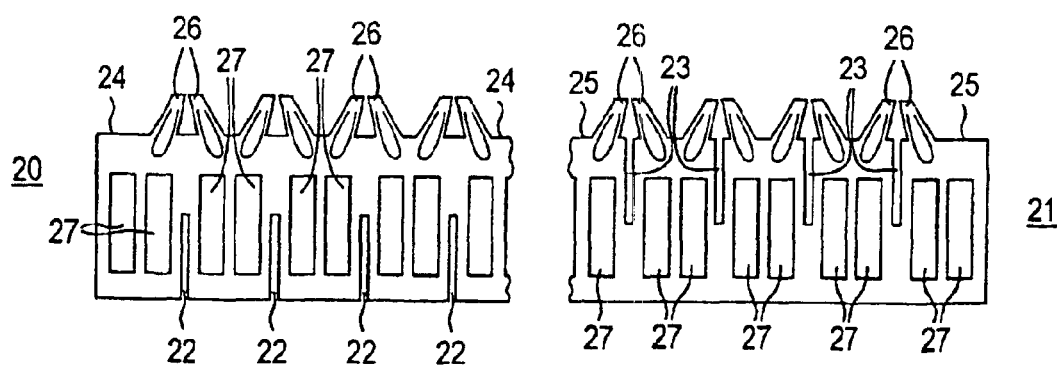
FIGS. 3 and 4 are sections of webs of a spacer from the fuel assembly in their natural size.

A casing of the spacer 18, which can be seen in FIG. 2, comprises a grid of webs 20 and 21, which are illustrated in their natural size in excerpt form in FIGS. 3 and 4. The webs 20 and 21 differ substantially only by the fact that mounting slots 22 are provided at the bottom in the web 20 while mounting slots 23 which are open at the top are provided in the web 21. In the exemplary embodiment illustrated, in each case nine webs 20, which are parallel to one another, are introduced from the top into nine webs 21, which are likewise parallel to one another and are arranged at right angles to the webs 20, in a comb-like manner, moving into the mounting slots 23 in such a manner that their own mounting slots 22 flank the lower halves of the webs 21. A grid which is formed in this way forms mesh openings which are square in cross section and each of which receives a fuel rod 16 or a holding rod 19 and, in a manner which is not illustrated, centers it by means of fixed and flexible support means. The holding rods 19 and fuel rods 16 guided by the grid comprising the webs 20 and 21 form cooling passages with a cruciform cross section. The intersections of the webs 20 and 21 in this case lie in the center of a cruciform passage cross section of this type.

Figure 5:
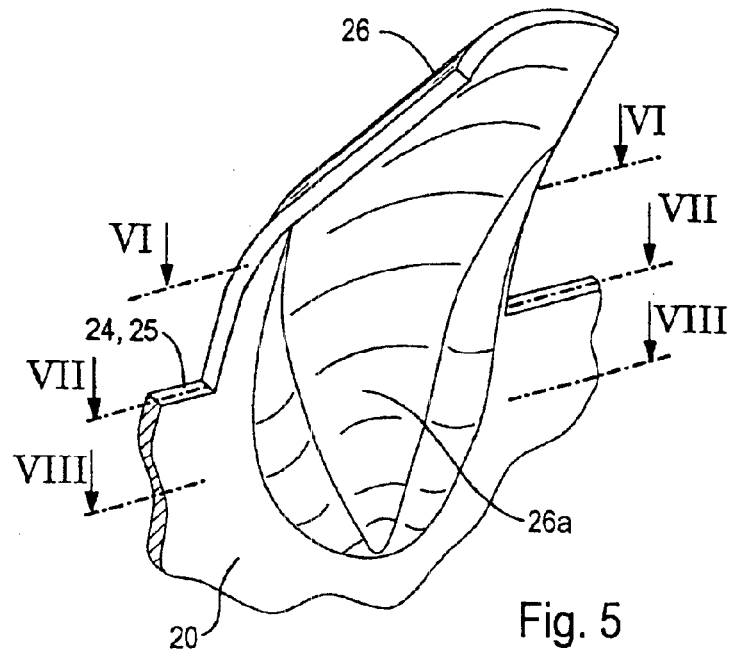
FIG. 5 is a perspective detail of a web with a vane in a highly enlarged illustration.
Figure 6:
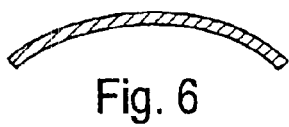
FIGS. 6 to 8 are cross sections taken through the vane of FIG. 5 along the lines VI—VI, VII—VII, and VIII—VIII, respectively.
Figure 7:
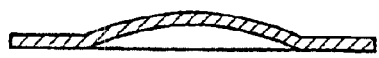
Figure 8:
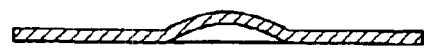

On their top edges 24 and 25, the webs 20 and 21 bear vanes 26 which are approximately twice as long as they are wide and which are bent out of or into the plane of the drawing by up to 45°. The longitudinal axis of a vane 26 in each case forms an acute angle with that section of the edge 24 or 25 which bears it which adjoins an intersection between the webs 20 and 21. At its free end, the vane 26 has a reduced width, preferably a width which is reduced by half, compared to its width at its root 26a (FIG. 5). In this case, on a single web 20 or 21 vanes 26 which are associated with the same intersection between the webs 20 and 21 are bent in opposite directions, and the vanes 26 which are associated with the same mesh opening in the grid are bent in the same direction. In this way, when the grid formed by the webs 20 and 21 is seen from above, at each intersection all four vanes are bent either in the clockwise or counter-clockwise direction, opposite bending directions being effected at intersections which respectively adjoin one another. As a result, at adjacent intersections the vanes generate oppositely directed swirl impulses in the stream of coolant flowing past them.

In each of the webs 20 and 21 there is, at least beneath each vane 26, an opening 27 which connects adjacent mesh openings in the grid formed by the webs 20 and 21 to one another. These openings 27 make it possible to produce transverse components in the stream of coolant directed substantially parallel to the fuel rods 16 and in this way reduce the effects of the residual flow resistance of the vanes 26.

As shown in FIGS. 5 to 8, the vanes 26 are curved in both the longitudinal direction and the transverse direction, irrespective of their deviation out of the plane of the webs 20 and 21. They are therefore in the shape of a spoon or a paddle; while they are being shaped, they are stretched and/or compressed in more than one direction. This shape means that the area moments of inertia of both the cross sections lying parallel to the longitudinal axis of the vane 26 and the cross sections lying at right angles to this longitudinal axis are so high that forces which occur during normal operation do not deform the vanes 26 on their own and overall cannot make them deviate significantly in any direction. As a result, forces 10 which are exerted on the concave side of the vane 26 by the stream of coolant are unable to make the vane 26 oscillate with significant amplitudes even if the webs 20 and 21—like the vanes 26—consist of a single piece of metal sheet which is only 0.2 mm thick. These advantages are promoted further as a result of the spoon-like or paddle-like shape continuing into the web 20 or 21 over 0.5 to 1 times the length of the vane 26. In this case, the area moment of inertia of the cross sections of the vane 26 in the region where they are attached to the web 20 or 21 reaches a maximum at the height of the edge 24 or 25.

A grid provided in the spacer 18 may also be composed of sleeves which are round in cross section instead of webs 20 and 21 which cross one another at right angles. In this case, one sleeve is required for each grid mesh opening, bearing four vanes 26 per sleeve instead of the grid described above.

The invention can also be used in a corresponding way on the fuel assemblies, which do not have any fuel assembly channels, of pressurized water reactors (PWRs).

We claim:

1. A fuel assembly for a nuclear reactor in a nuclear power plant, comprising:
   a plurality of spacers;
   a multiplicity of fuel rods extending in a longitudinal direction through said spacers;
   said fuel rods defining a passage for a flow of coolant therebetween; and
   at least one of said spacers being formed with webs and carrying a vane disposed to impart a swirl impulse to the flow of coolant, said vane being curved in the longitudinal direction and in a transverse direction and having a shape resembling a spoon or a paddle and two mutually intersecting webs each bearing a respective vane on both sides of an intersection thereof disposed for producing oppositely directed swirl impulses.

2. The fuel assembly according to claim 1, wherein said vane has a root within said at least one spacer and the curved shape of said vane continues to said root.

3. The fuel assembly according to claim 1, wherein said vane has a cross section with defined area moment of inertia, and the area moment of inertia is at a maximum in a region where said vane emerges from said at least one spacer.

4. The fuel assembly according to claim 1, wherein said vane has a cross section with defined area moment of inertia, and the area moment of inertia is set during a production of said vane by stretching and/or compressing a material of said vane in more than one direction.

5. The fuel assembly according to claim 1, wherein said vane has a root and a free end, and a width of said vane at said free end is smaller than a width at said root.

6. The fuel assembly according to claim 5, wherein the width at said free end is half the width at said root.

7. The fuel assembly according to claim 1, wherein said vane has a root and a free length, and said free length of said vane is approximately twice a width at said root.

8. The fuel assembly according to claim 1, wherein said vane and a web of said at least one spacer bearing said vane are integrally formed of a single workpiece.

9. The fuel assembly according to claim 1, wherein said vane has a free length and the curved shape of said vane continues into said spacer over a distance of 0.5 to 1.0 times said free length of said vane.

10. The fuel assembly according to claim 1, wherein said vane has a root and a long axis, said at least one spacer has a web carrying said vane and separating cells of said at least one spacer, and said web has an opening formed therein underneath said root of said vane in a direction of the long axis of said vane.

11. The fuel assembly according to claim 1, wherein said at least one spacer has a web carrying said vane, and said vane is bent by up to 45° out of a plane of said web and into the passage for the flow of coolant, and wherein the flow of coolant impinges on a concave side of said vane.

12. The fuel assembly according to claim 1, wherein said at least one spacer is formed with webs, and a longitudinal axis of said vane forms an acute angle with a longitudinal edge of said web on a side thereof facing an adjacent intersection with a respectively other web.

13. The fuel assembly according to claim 1, wherein all said vanes adjoining a common intersection act on the stream of coolant in the same direction.

14. The fuel assembly according to claim 1, wherein the coolant flowing through said at least one spacer defines an outflow end of said spacer, and said vanes are supported by webs of said spacer on the outflow end thereof.

15. The fuel assembly according to claim 1, wherein said at least one spacer is comprised of webs formed by sleeves with mutually interconnected longitudinal sides and each surrounding a respective said fuel rod.

* * * * *